(12) United States Patent
Timmons, Jr.

(10) Patent No.: US 7,694,993 B2
(45) Date of Patent: Apr. 13, 2010

(54) TRAILER STEERING MECHANISM

(76) Inventor: Ronald G. Timmons, Jr., 7799 SE. 64th St., Newberry, FL (US) 32669

( * ) Notice: Subject to any disclaimer, the term of this patent is extended or adjusted under 35 U.S.C. 154(b) by 346 days.

(21) Appl. No.: 11/783,296

(22) Filed: Apr. 6, 2007

(65) Prior Publication Data
US 2008/0246253 A1 Oct. 9, 2008

(51) Int. Cl.
*B62D 53/00* (2006.01)

(52) U.S. Cl. ...................... 280/442; 280/448

(58) Field of Classification Search ......... 280/442–445, 280/448
See application file for complete search history.

(56) References Cited

U.S. PATENT DOCUMENTS

| | | | |
|---|---|---|---|
| 1,955,178 A | | 4/1934 | Elwood |
| 2,092,683 A | | 9/1937 | Stidham |
| 2,533,553 A | | 12/1950 | Burns |
| 2,929,642 A | | 3/1960 | Dinkel et al. |
| 3,105,704 A | | 10/1963 | Schramm |
| 3,212,793 A | * | 10/1965 | Pietroroia ............... 280/443 |
| 3,753,580 A | * | 8/1973 | Folkert .................. 280/443 |
| 4,042,255 A | | 8/1977 | Drewek et al. |
| 4,133,552 A | | 1/1979 | Sheine |
| 4,208,063 A | | 6/1980 | Baker et al. |
| 4,313,616 A | | 2/1982 | Howard |
| 4,345,775 A | * | 8/1982 | Merrifield ............... 280/443 |
| 4,405,147 A | | 9/1983 | Horsman et al. |
| 4,451,058 A | | 5/1984 | Curry |
| 4,720,119 A | | 1/1988 | Ritter |
| 5,244,226 A | * | 9/1993 | Bergh ................... 280/442 |
| 5,364,117 A | | 11/1994 | Keith |
| 5,382,041 A | | 1/1995 | Keith |
| 5,784,967 A | * | 7/1998 | Lohr ....................... 105/3 |
| 6,431,576 B1 | * | 8/2002 | Viaud et al. ............ 280/442 |
| 2004/0217575 A1 | | 11/2004 | Beaujot et al. |
| 2005/0046146 A1 | | 3/2005 | Plante |

FOREIGN PATENT DOCUMENTS

| | | |
|---|---|---|
| DE | 3538338 | 4/1987 |
| DE | 4216543 | 12/1992 |
| DE | 10236335 | 2/2003 |

OTHER PUBLICATIONS

Website, http://www.supertow.co.za/products.html, "The New Generation" 2002 model anti-jacknife steerable trailer, four sheets printed Jan. 16, 2006.
Website, http://www.northerntool.com/webapp/wcs/stores/servlet/ProductDisplay?storeId=6970&productId=200311373&R=200311373, Precision Products 4-Wheel Steerable Dual Axle Trailer Cart, one sheet printed Jan. 16, 2006.
Website, http://www.discount-trailers.com/smart-trailer.htm, Smart Trailer SL-200, three sheets printed Feb. 5, 2007.

* cited by examiner

*Primary Examiner*—Lesley Morris
*Assistant Examiner*—Levon Fiore
(74) *Attorney, Agent, or Firm*—Richard C. Litman

(57) ABSTRACT

The trailer steering mechanism automatically steers the wheels of a trailer in accordance with the tow vehicle steering and articulation between the tow vehicle and trailer during backing maneuvers in order to facilitate backing maneuvers and to prevent or greatly reduce the possibility of jackknifing between tow vehicle and trailer. The mechanism includes a pivotally attached steering frame connected between the steerable wheels of the trailer and one or more hydraulic cylinders that, when locked, create a very strong link between the tow vehicle and the trailer and its steering system. The hydraulic cylinders are able to withstand great loads, and more importantly, are able to disengage while under great load without jamming. The hydraulic cylinders provide links that exert lateral force to the trailer to push or pull the trailer into a turn while backing, in addition to controlling the steering mechanism of the trailer.

14 Claims, 11 Drawing Sheets

TRAILER STEERING MECHANISM

BACKGROUND OF THE INVENTION

1. Field of the Invention

The present invention relates generally to vehicle steering systems, and particularly to a trailer steering mechanism for towing a trailer behind a motor vehicle.

2. Description of the Related Art

The towing vehicle and trailer combination is an inherently unstable one during backing maneuvers. Even a simple trailer having a single axle with non-steerable wheels requires some skill by the driver of the towing vehicle during backing maneuvers. This is because of the articulation between the towing vehicle and trailer, which allows the trailer to turn relative to the towing vehicle. Once the trailer begins to turn, even continued straight backing by the towing vehicle will cause the trailer to turn ever more sharply, resulting in the jackknifing of the trailer and towing vehicle in short order.

While the above problem can be overcome by a skilled driver operating a single axle trailer, other trailer configurations can be impossible to back. For example, truck tractors, or other towing vehicles towing multiple articulated trailers in tandem, can only successfully back the single trailer connected directly to the towing vehicle. There is no way for the driver of the towing vehicle to steer both trailers of such a configuration while backing. Another example is the farm wagon-type trailer, having a front axle with steerable wheels and a rear axle with directionally fixed wheels. This combination cannot be backed due to the instability of the steerable front wheels of the trailer, which causes a castering action when backing.

A number of different trailer steering mechanisms have been developed over the years in attempts to solve at least some of the above-described problems.

German Patent No. 3,538,338, published on Apr. 30, 1987, describes (according to the drawings and English abstract) an electrical system incorporating servomotors to drive the trailer steering. The drawings are primarily directed to the electronic circuitry used in the system.

German Patent No. 4,216,543, published on Dec. 3, 1992, describes (according to the drawings and English abstract) a rigid linkage of two or more struts or tow bars between the towing vehicle and trailer, which angularly lock the trailer relative to the towing vehicle and prevent articulation therebetween. The trailer wheels are not actively steered, but, rather, caster to follow the turns of the towing vehicle during both forward and reverse travel. The lateral hydraulic cylinder disclosed in the drawings is not a steering actuation link or element, but is a shimmy damper, as conventionally applied to castering wheel systems.

Finally, German Patent No. 10,236,335, published on Feb. 27, 2003, indicates (according to the English title and abstract) that the subject trailer has a steerable front axle. However, no such steering mechanism is apparent in the drawings of the two-axle trailer. It appears that the trailer actually has castering front wheels, with no positive steering system being apparent.

None of the above inventions and patents, taken either singly or in combination, is seen to describe the instant invention as claimed. Thus, a trailer steering mechanism solving the aforementioned problems is desired.

SUMMARY OF THE INVENTION

The trailer steering mechanism facilitates the backing of a trailer by steering the trailer wheels in the same direction as the towing vehicle during backing maneuvers. The system automatically locks the trailer wheels straight for forward travel. A pivotally mounted steering frame is provided beneath the trailer frame, with the steering frame acting upon the tie rod(s) of the steerable wheels of the trailer. The steering frame receives its input from one or more hydraulic cylinders extending between the steering frame and a hitch bar, with the hitch bar being rigidly and immovably secured to the towing vehicle. The hydraulic cylinder(s) is/are hydrostatically locked during backing maneuvers, thus causing the steering frame of the trailer to pivot according to articulation between the trailer and towing vehicle when backing. The trailer follows (or more accurately leads, during backing maneuvers) the path of the towing vehicle during such backing maneuvers.

The locking of the hydraulic cylinder(s) or strut(s) is controlled by one or more valves, which control hydraulic flow between the two ends of the double acting cylinder(s). The valves are, in turn, controlled by an electric motor or other electric drive, which is, in turn, controlled by the conventional electrical back-up signal (backing lights, alarm bell or signal, etc.) provided for most motor vehicles. When no signal or electrical power is provided for backing, the valve(s) is/are open to allow relatively free hydraulic flow through the cylinder(s) or strut(s). This allows the cylinder(s) to extend and retract with articulation between the trailer and towing vehicle, while the steering frame of the trailer remains locked straight ahead to lock the wheels of the trailer. When the tow vehicle is placed in reverse, electrical power is received from the backing circuit of the tow vehicle to close the valve(s), thereby locking the hydraulic cylinder(s) to cause the trailer steering frame to move with the tow vehicle, thereby steering the trailer wheels.

The trailer steering mechanism may make use of various systems for actuating the hydraulic valve mechanism of the trailer, including multiple valves actuated by a single motor and chain or cable drive, or even a rigid rod linkage between the motor and valves, or a single valve having multiple ports, electrically operated solenoid valves, etc. Alternatively, the valve mechanism may be actuated by a self-contained electrical system on the trailer, or by manual operation if so desired. The hydraulic cylinder control valve(s) or hydraulic circuit may include one or more relief valves to relieve extreme pressures and forces in the system in the event of extreme steering angles by the tow vehicle during backing maneuvers. One or more steering frame and axle centering springs and adjustable steering stops may be provided to assist in centering the trailer steering and limit the steering angle of the trailer wheels. A mechanical latch may be provided to lock the trailer steering frame, and thus the trailer wheels, straight ahead for forward travel, with the latch automatically releasing for backing maneuvers and automatically engaging for forward travel. The mechanism may be applied to trailers having a forward and a rearward axle, i.e., farm wagons, with a link provided to a modified rear axle assembly permitting steering of the rear wheels in concert with the freely steering front wheels of the trailer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a steering mechanism for trailers having steerable wheels, and various trailer configurations incorporating such a steering mechanism. The steering mechanism allows the steerable wheels of the trailer to be steered positively according to articulation between the towing vehicle and the trailer during backing maneuvers, while locking the steerable wheels straight ahead for forward travel of the trailer.

Figure 1:
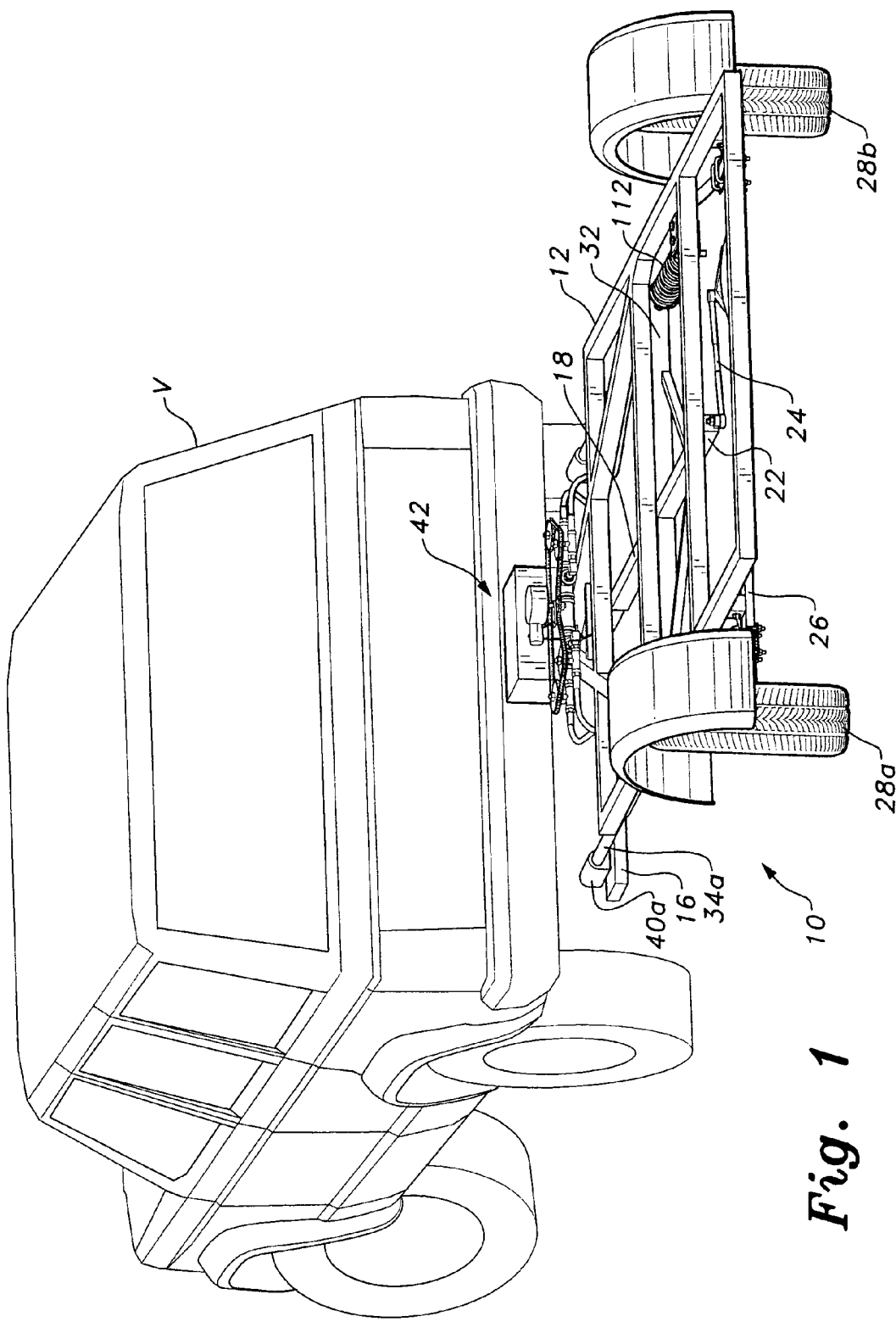
FIG. 1 is an environmental, perspective view of a towing vehicle with a trailer incorporating a trailer steering mechanism according to the present invention, showing its operation during a backing maneuver.
Figure 2:
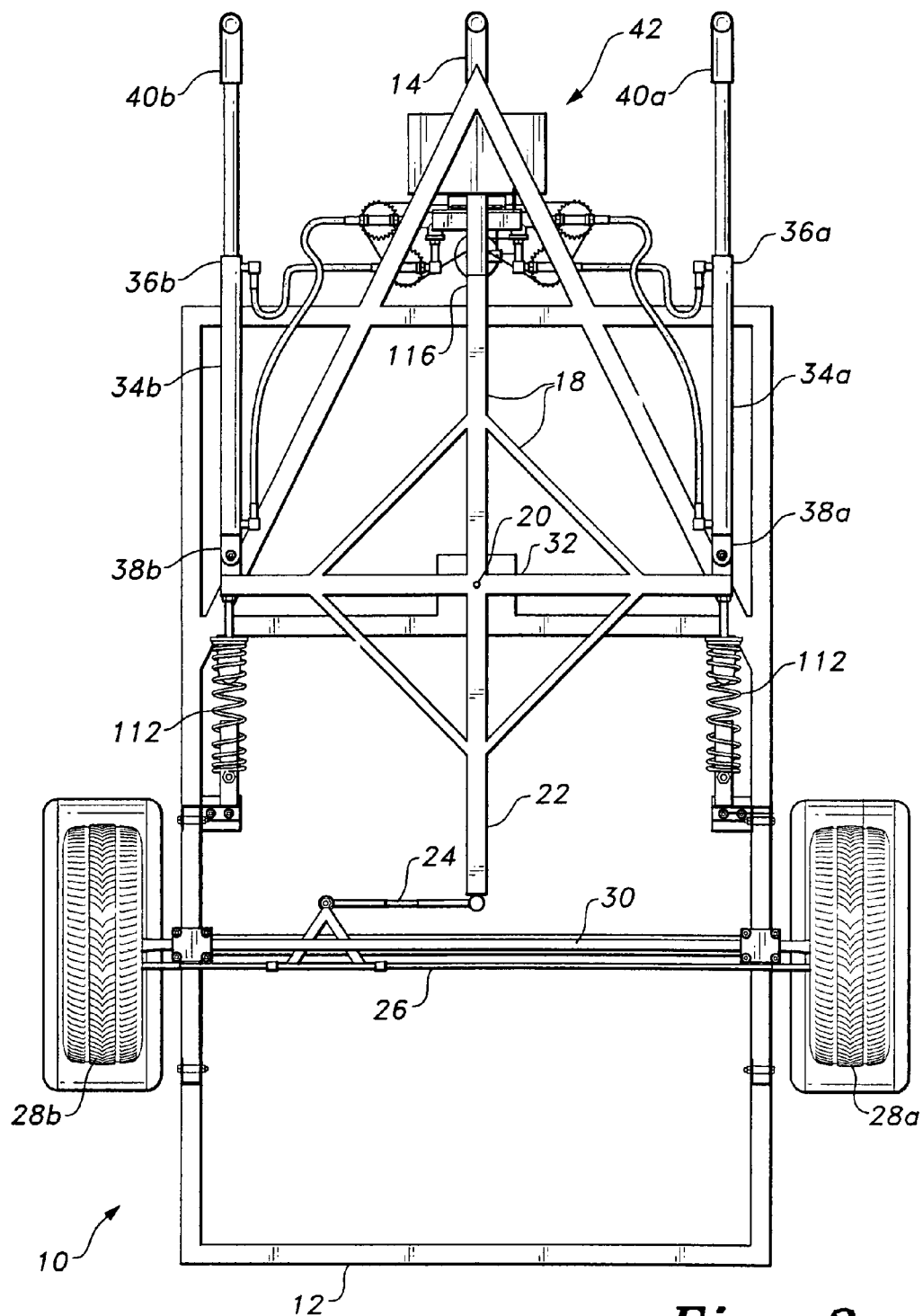
FIG. 2 is a bottom plan view of a trailer incorporating the trailer steering mechanism of the present invention, showing the general configuration thereof.

FIG. 1 of the drawings provides an environmental perspective view of a trailer 10 with its steering mechanism, shown hitched behind a towing vehicle V, with FIG. 2 providing a bottom plan view of the trailer 10 and its steering mechanism. The trailer 10 includes a frame 12 having a forwardly extending rigid tongue 14, with the tongue 14 being removably and pivotally hitched to a lateral three-ball hitch bar 16 attached to the tow vehicle V. The hitch bar 16 is shown most clearly in the top plan view illustrations of FIGS. 3, 4, and 5, and is rigidly and immovably secured to the tow vehicle V by means of a conventional receiver hitch or the like. The hitch bar 16 comprises a three-ball hitch bar, having a central ball for the removable connection of the trailer tongue 14 coupler thereto and opposite left and right balls for the removable connection of the couplers of the left and right hydraulic cylinders (described in detail further below) thereto.

The steerable trailer 10 includes a steering frame 18 attached beneath the trailer frame 12 at a pivot 20. The location of the pivot point 20 for the steering frame 18 may vary from that shown, so long as the geometry of the steering linkage (i.e., various arm lengths, arcuate and linear movements, etc.) is adjusted accordingly. In the example of FIG. 2, the steering frame 18 includes a rearwardly extending steering arm 22, which connects to an intermediate link 24 between the distal end of the arm 22 and the tie rod(s) 26 of the steerable trailer wheels 28a, 28b, which extend from each end of the axle 30 of the trailer 10. The wheels 28a, 28b are attached to the trailer axle 30 by conventional articulated joints, e.g., king pins, etc., to allow the trailer wheels 28a, 28b to be steered when the steering frame 18 pivots to move the tie rod(s) 26 by means of the intermediate link 24.

The steering frame 18 includes a crossmember 32 which provides for attachment of at least one hydraulic cylinder to the steering frame, with there preferably being one hydraulic strut or cylinder 34a installed to the left side of the trailer tongue 14 and a second strut or cylinder 34b installed to the right side of the tongue 14. Alternatively, plural struts or cylinders may be installed to each side of the central tongue 14, if so desired, depending upon the rating of each hydraulic cylinder or strut and the size of the trailer and maneuvering forces required. Each of the cylinders 34a, 34b has a hitch coupling end 36a and 36b and an opposite steering frame attachment end 38a and 38b, with the forward coupling ends 40a, 40b of the cylinders being pivotally coupled to, and extending from, the corresponding ends of the hitch bar 16, and the steering-frame attachment ends 38a, 38b attaching to the ends of the steering frame crossmember 32. The struts or cylinders 34a, 34b are parallel to the trailer tongue 14 and to one another, with the tongue 14 centered between the two struts or cylinders.

The trailer steering mechanism is selectively actuated according to forward or reverse travel of the tow vehicle V and trailer 10, with the steering mechanism being locked in a neutral position with the trailer wheels 28a, 28b straight ahead regardless of articulation between the towing vehicle V and trailer 10 during forward motion, and with the hydraulic cylinders 34a, 34b being hydraulically locked to transmit articulation between the hitch bar 16 of the tow vehicle V and the steering frame 18 of the trailer 10 to steer the trailer wheels 28a, 28b during backing maneuvers. This is controlled by a hydraulic strut or cylinder control mechanism 42, shown in detail in FIG. 6 of the drawings.

In the mechanism 42 embodiment of FIGS. 1 through 4 and FIG. 6, a series of four hydraulic control valves 44 through 50 are controlled by a single valve actuator 52. The first control valve 44 is positioned between a source of hydraulic fluid or reservoir 54 and the hitch bar attachment end 36a of the first or left side hydraulic cylinder or strut 34a. The second control valve 46 is positioned between the hydraulic reservoir 54 and the steering frame attachment end 38a of the first or left side cylinder or strut 34a. The third control valve 48 is positioned between the hydraulic reservoir 54 and the hitch bar attachment end 36b of the second or right side hydraulic cylinder or strut 34b, with the fourth control valve 50 being positioned between the hydraulic reservoir 54 and the steering frame attachment end 38b of the second or right side cylinder or strut 34b.

The four valves 44 through 50 are linked to the actuator 52 by a roller chain 56, which is driven by a drive sprocket 58 extending from the actuator, with the drive sprocket 58, in turn, driving a valve sprocket 60 extending from each of the valves. When the actuator 52 is rotated, its sprocket 58 drives the chain 56 to rotate each of the driven sprockets 60 of the four valves, thereby turning the valves on or off according to the operation of the actuator. It will be seen that other mechanisms may be used in lieu of the above-described mechanism, e.g., a cable drive, a series of rigid pushrods between the valves, etc., or even manual actuation, as desired. Alternatively, electric solenoid valves may be used in lieu of mechanically or manually actuated valves, if so desired.

The actuator 52 is driven by an electric motor 62, which is controlled by a solenoid switch 64, with the solenoid 64 receiving power from the conventional backup signal 66 (backup lights, bells, etc.) provided on tow vehicles. A separate manually-controllable cutout switch 68 may be included in the circuit, if so desired, in order that the trailer wheels may be locked straight during backing maneuvers, e.g., when maneuvering in tight quarters. Assuming the cutout switch 68 is closed, shifting the tow vehicle into reverse provides electrical power to the solenoid switch 64 to actuate the valve actuator control motor 62. This rotates the actuator 52, thereby driving the chain 56 to rotate each of the valve sprockets 60 to close their corresponding valves 44 through 50 to hydraulically lock the lengths of the two cylinders 34a and 34b. This results in articulation between the tow vehicle V and trailer 10 turning the steering frame 18 of the trailer, thereby turning the trailer wheels 28a and 28b, as described further above. This is the preferred means of carrying out the control of the system, i.e. providing electrical power from the tow vehicle. However, electrical valve actuation may be accomplished by electrical power supplied by a source on the trailer, if so desired.

Figure 10:
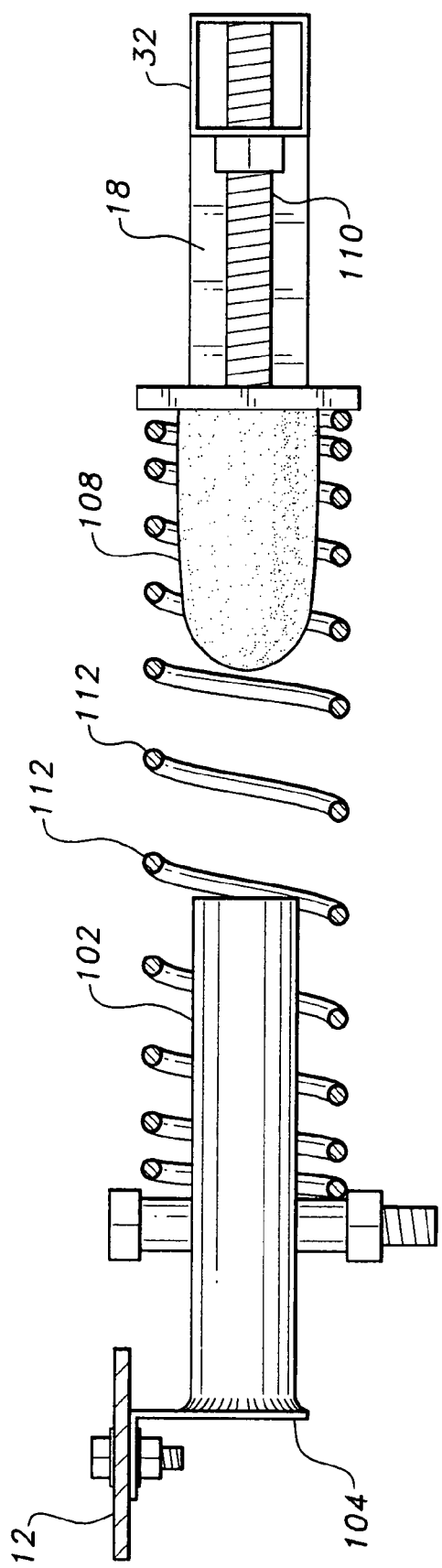
FIG. 10 is a detailed side elevation view in partial section of one of the steering centering and limit devices of a trailer steering mechanism according to the present invention.

Shifting of the tow vehicle to a forward gear (or opening the cutout switch 68) shuts off the electrical signal to the solenoid 64, thereby shutting off power to the actuator motor 62. This allows the actuator 52 to return to its original position, driving the chain 56 and valve sprockets 60 to open the various hydraulic cylinder or strut control valves 44 through 50. Alternatively, a separate circuit may be provided to drive the motor 62 in the opposite direction to open the valves for forward travel. This allows hydraulic fluid to flow relatively freely through the system, with the two hydraulic cylinders 34a and 34b extending and retracting with articulation between the tow vehicle V and trailer 10 as the assembly turns during forward motion. The viscosity of the hydraulic fluid flowing through the system during turning maneuvers does provide some beneficial damping of any unwanted sway between the trailer and tow vehicle. Since the hydraulic cylinders are no longer hydraulically locked, they do not impart any significant thrust or force upon the steering frame 18 to steer the wheels of the trailer. However, a positive mechanical lock may be provided for the steering frame 18 to assure that the trailer wheels are locked straight ahead during forward travel for stability of the trailer and tow vehicle assembly. This locking mechanism is illustrated in FIG. 10, and discussed further below.

It will be seen that there is no hydraulic pump installed in this hydraulic system, as none is required. The hydraulic system of the present mechanism merely serves to selectively lock the lengths of the hydraulic cylinders or struts 34a and 34b to lock the relative orientation of the steering frame 18 relative to the hitch bar 16 of the tow vehicle V when backing, thus causing the locked hydraulic cylinders to steer the steering frame to turn the trailer wheels. Conversely, free flow of hydraulic fluid is permitted back and forth between the cylinders 34a and 36a when in forward travel, thus allowing articulation between the trailer 10 and tow vehicle V while the steering frame 18 is locked to lock the trailer wheels straight ahead. While no hydraulic pump is required, the closed and sealed system may be pneumatically pressurized, if so desired, by adding some predetermined air (or other gas) pressure to the reservoir 54 to serve as a preload for the system. The provision of a closed, sealed system provides additional benefits as well in preventing contaminants (e.g., road dirt and debris, moisture, etc.) from entering the system, thus adding to the longevity of the hydraulic fluid in the system as well as to the components of the system.

Figure 6:
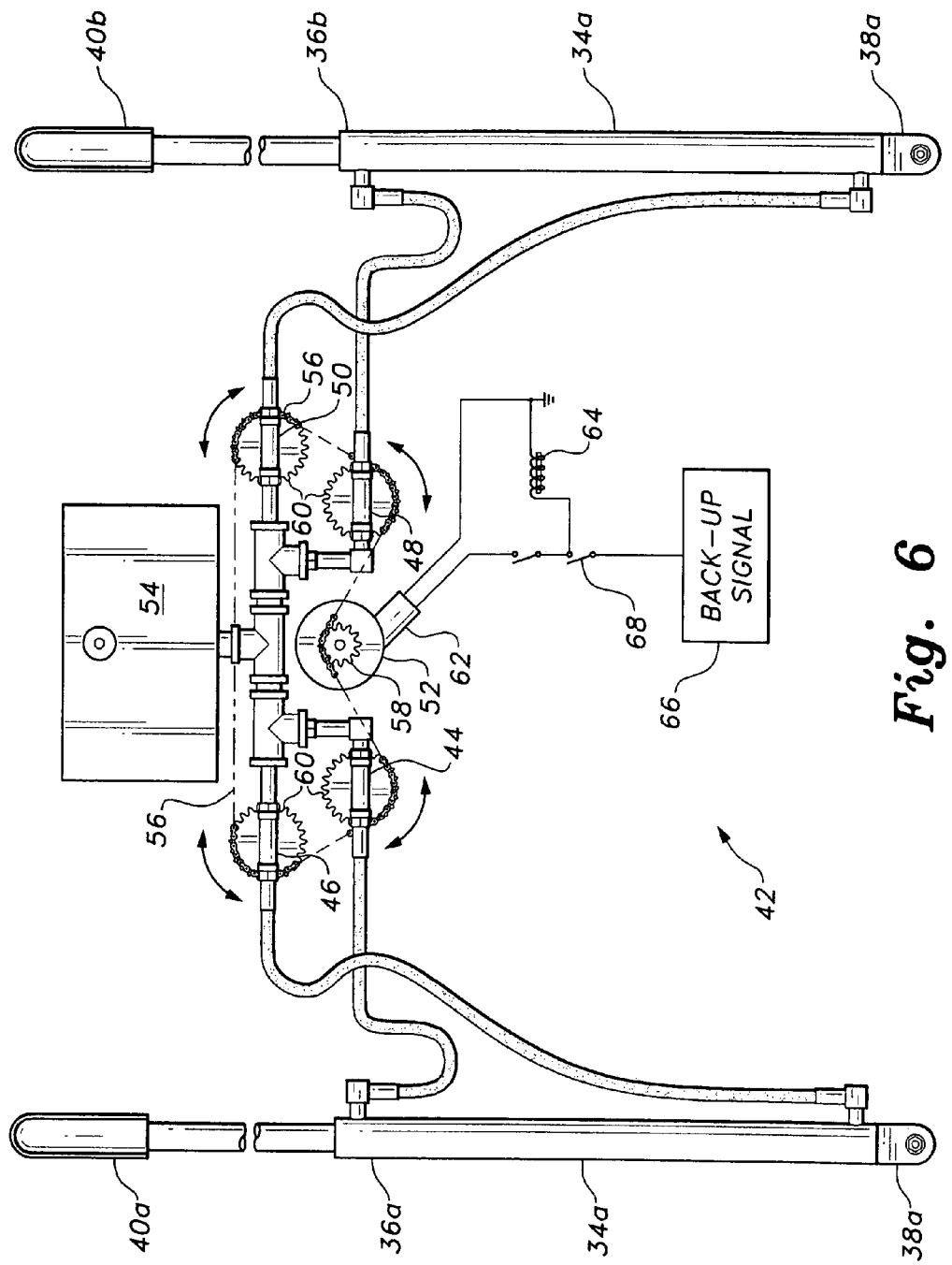
FIG. 6 is a detailed top plan view showing a first embodiment of an actuating mechanism for the hydraulic valves of a trailer steering mechanism according to the present invention.
Figure 7:
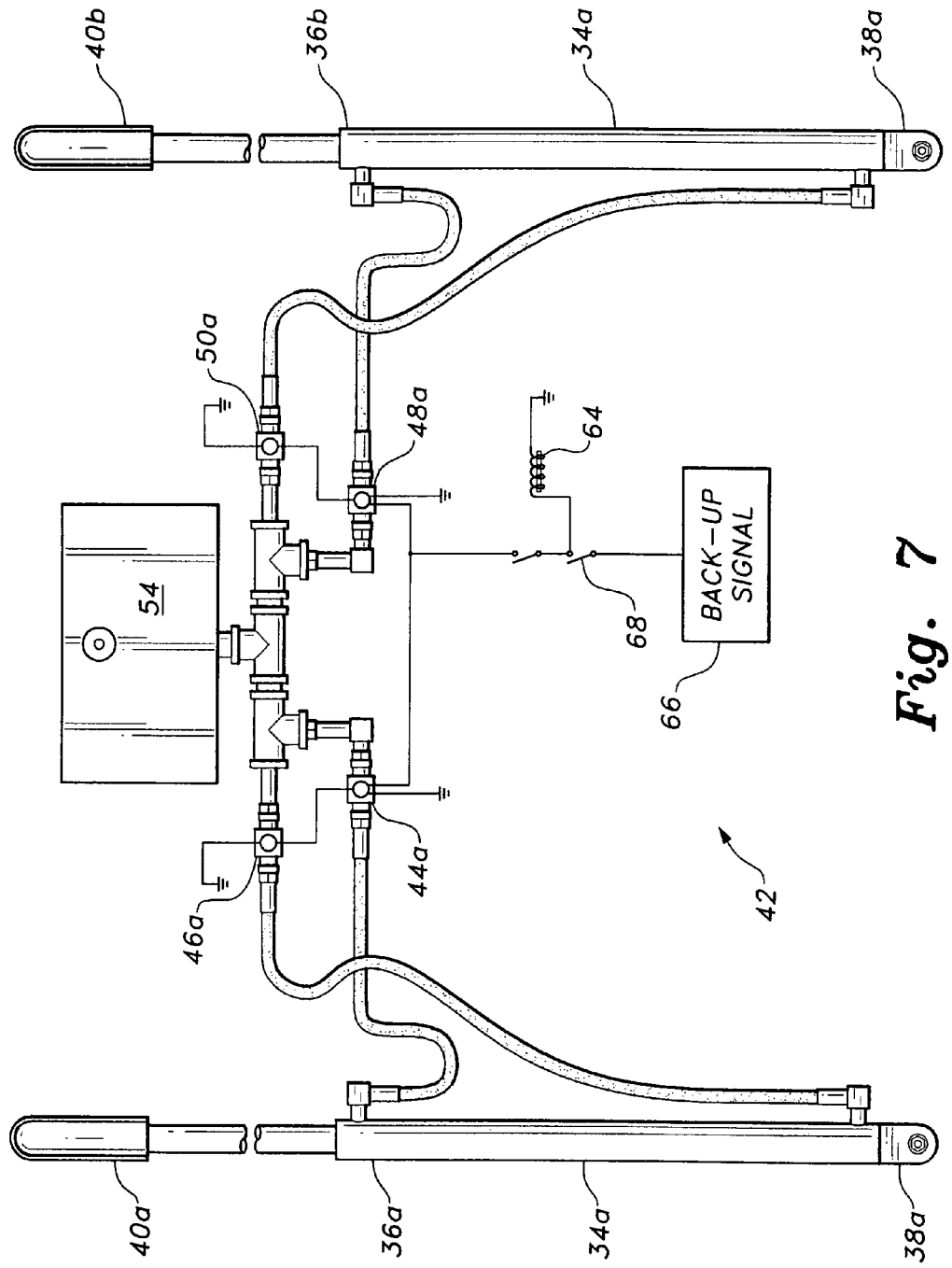
FIG. 7 is a detailed top plan view showing another embodiment of an actuating mechanism for the hydraulic valves of a trailer steering mechanism according to the present invention, wherein the system incorporates electrically actuated solenoid valves to control hydraulic flow.

FIG. 7 provides a top plan view in which the above-described hydraulic system (illustrated in FIG. 6) is controlled by electrohydraulic solenoid valves 44a through 50a. The electrohydraulic solenoid valves 44a, 46a, 48a, and 50a each include a hydraulic valve selectively permitting or stopping the flow of hydraulic fluid therethrough, with the hydraulic valve being controlled by the mechanical action of an electrically actuated solenoid. Accordingly, the mechanical system shown in FIG. 6 is not needed for control of the electrically actuated valves 44a-50a of the embodiment of FIG. 7. Electrical power to the electrohydraulic solenoid valves 44a through 50a may be controlled through an electrical circuit identical to that used for the control and operation of the electric motor 62 driving the valve actuator 52 for the mechanical system of FIG. 6, i.e., a solenoid 64 receiving power from the back-up system 66 of the tow vehicle. A separate conventional electrical power source may be provided from the tow vehicle or an electrical source on the trailer (e.g., battery, etc.) if more electrical power is required than can be provided through the back-up system 66, with the actuation of the separate power source being controlled by another solenoid similar to the solenoid 64 shown in FIGS. 6 and 7, or a double pole solenoid or the like.

Figure 8:
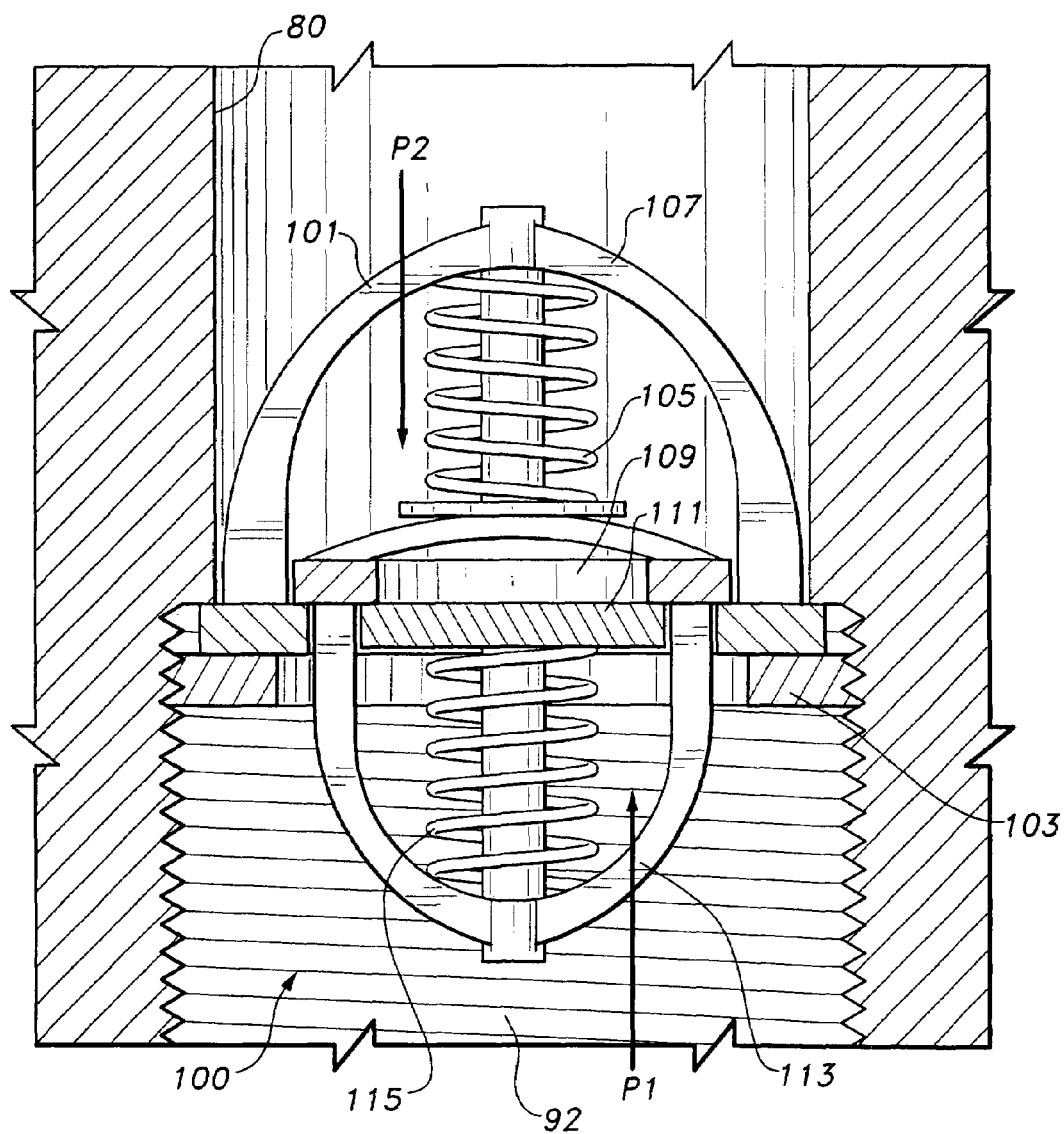
FIG. 8 is a plan view in section of an exemplary two-way or double-acting pressure relief valve for use in the trailer steering mechanism of the present invention.

FIG. 8 of the drawings provides a side elevation view in section of an exemplary double-acting or two-way pressure relief valve 100, which may be incorporated in the trailer steering mechanism. This two-way valve 100 serves to relieve excessive hydraulic pressure in the system in either direction of flow through the valve. The valve 100 includes a stationary frame 101, which is secured within a passage through the valve housing or body, e.g., the passage 92 of the rotary valve member 80 of FIG. 9, by a retaining ring 103 or the like. A first valve spring 105 extends between the stationary frame 101 and a first or outer poppet valve 107, with the first valve 107 opening toward the first spring 105 when sufficient pressure is developed to overcome spring pressure.

The first or outer valve 107 includes a central opening or passage 109 therethrough, which is sealed by a second poppet valve 111. The second valve 111 is held in position over the first valve opening 109 by a second frame 113, which extends from the first valve 107 opposite the first or stationary frame 101, with a second valve spring 115 being captured between the second frame 113 and second valve 111 to urge the second valve 111 against the inner face of the first valve 107. Thus, a first pressure P1 of sufficient force to compress the first valve spring 105 will force the second valve 111 against its seat on the first valve 107, but will push the first valve 107 open from its seat on its stationary frame 101 to relieve the excessive pressure P1. However, an opposite second pressure P2 acts in the same direction as the force developed by the first valve spring 105, with the first valve 107 accordingly remaining closed. But such a pressure P2 acts against the face of the second valve 111 and against its spring 115, pushing the second valve 111 open to relieve excessive pressure in the direction indicated by P2 in FIG. 8.

It will thus be seen that the pressure relief valve 100 can relieve excessive hydraulic pressure in either direction using only a single valve. Moreover, the two springs 105, 115 may be provided with adjustable compressive force by means of threaded retainers between the respective valve frames and valves in order to allow the opening force for each valve 107, 111 to be adjusted as desired. It will be seen that such a two-way or double-acting pressure relief valve(s) 100 may be incorporated in the hydraulic circuits of FIGS. 6 and/or 7, wherein four separate control valves are used, with each incorporating a single two-way pressure relief valve 100. Alternatively, single directional relief valves may be incorporated by means of two separate parallel hydraulic paths between each control valve or port and corresponding hydraulic cylinder or strut end.

Figure 9:
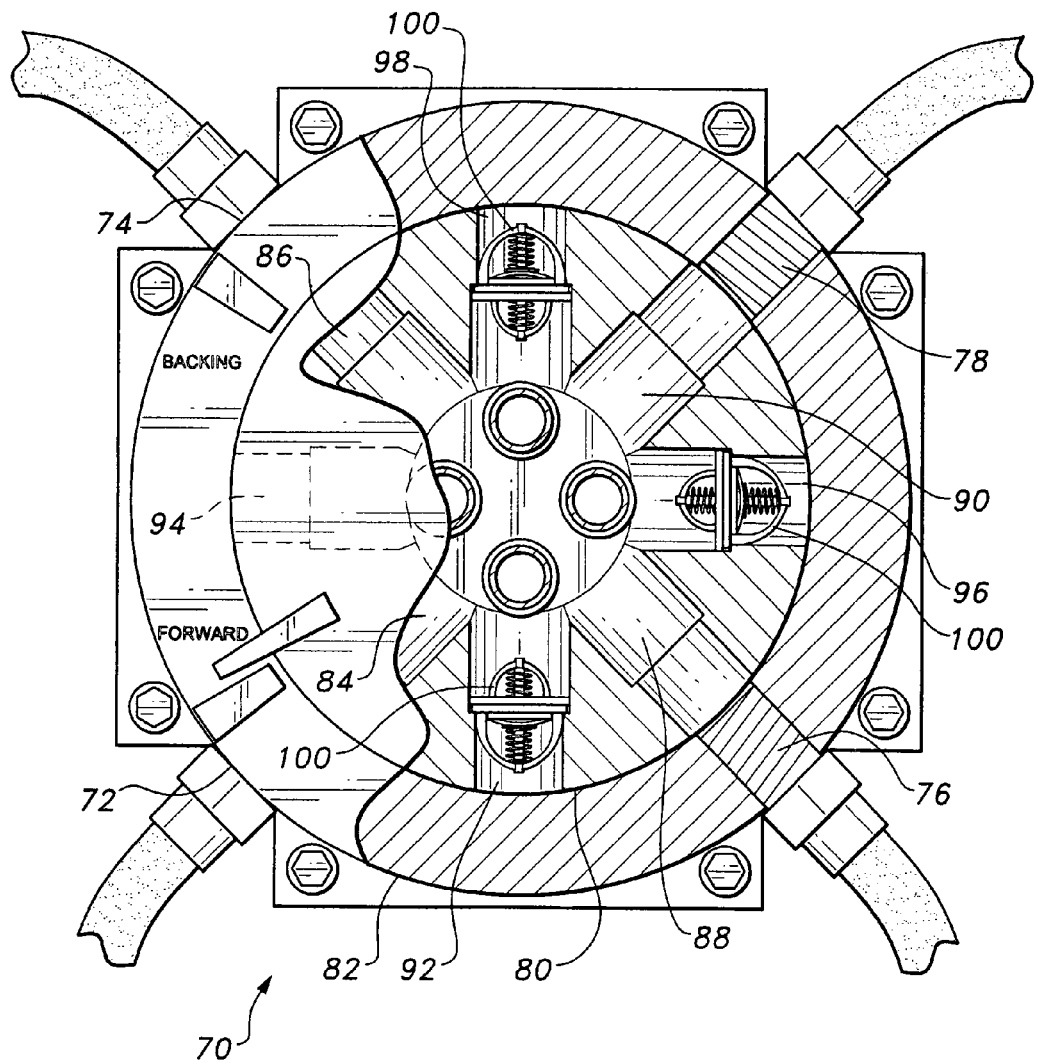
FIG. 9 is a detailed top plan view of an alternative embodiment of a valve mechanism for a trailer steering mechanism according to the present invention, incorporating the entire valve mechanism in a single housing.

FIG. 9 of the drawings illustrates an alternative valve assembly 70, which may be incorporated in the trailer steering mechanism in lieu of the four separate valves and actuator illustrated in detail in FIGS. 6 and 7 and described above. The valve assembly 70 of FIG. 9 incorporates four separate valve ports or outlets, respectively 72 through 78, which communicate hydraulically with the respective hitch coupling end 36a and steering frame arm attachment end 38a of the first or left hydraulic cylinder or strut 34a and the hitch coupling end 36b and steering frame arm attachment end 38b of the second or right hydraulic cylinder or strut 34b. A single rotary member 80 rotates within the valve body 82 to selectively align the four hydraulic passages 84 through 90 of the rotary member 80 with the four outlet ports 72 through 78 of the valve assembly 70 to allow flow between the ends of the hydraulic cylinders 34a and 34b so that the trailer wheels 28a, 28b may be locked straight ahead for forward travel of the trailer 10. The valve assembly 70 is illustrated in this open flow configuration for forward travel in FIG. 9.

When the trailer 10 is to be backed, the rotary center member 80 of the valve assembly 70 is rotated (manually, or by means of an actuator motor and electrical circuit, such as the motor 62 and circuit shown in FIG. 6 and described further above) through forty-five degrees to align the passages 84 through 90 of the rotary member 80 with the closed interior sidewalls of the valve body 82, thereby shutting off flow between those passages 84 through 90 and their respective hydraulic cylinders 34a and 34b to lock the cylinders hydraulically.

However, it will be noted that the valve assembly 70 includes additional restricted flow passages 92 through 98, each of which includes a two-way pressure relief valve 100 therein; such a two-way pressure relief valve 100 is shown in detail in FIG. 8 of the drawings, and has been described in detail above. When the valve 70 has been repositioned to close the primary passages 84 through 90 for backing operations, the pressure relief or restricted flow passages 92 through 98 are aligned with the four ports 72 through 78. So long as hydraulic pressure remains below a certain predetermined level(s) within the cylinders 34a, 34b and their hydraulic lines, the relief valves 100 remain closed.

However, in the event that, e.g., an excessive turning angle is reached that might cause damage to the mechanical steering mechanism, the relief valve(s) 100 will open briefly to relieve hydraulic pressure in the system, and then reset automatically once the pressure has been relieved. This limits the extension and/or retraction of the hydraulic cylinders or struts 34a, 34b, rather than having the locked cylinders exert excessive force upon the mechanical structure of the trailer 10 and its steering mechanism and possibly overstressing and/or damaging the structure.

FIG. 10 of the drawings provides a detailed side elevation view in partial section of an exemplary steering centering spring and stop limit assembly, which may be incorporated into the trailer steering mechanism. The assembly of FIG. 10 installs between the trailer frame 12 and the pivotal steering frame 18, or more precisely one (or both) of the lateral arms or crossmembers 32 of the steering frame. A steering angle limit stop 102 is secured (e.g., welded, etc.) to a bracket 104, which extends from the trailer frame 12. A steering stop bumper 108 is adjustably secured to the steering frame arm 32 by a threaded adjuster 110. The span between the end of the limit stop 102 and the end of the bumper 108 may be adjusted by means of the adjuster 110 to adjust the maximum angle or limit of the steering geometry of the trailer 10. A steering centering coil spring 112 is installed concentrically over and between the steering limit stop 102 and bumper 108 to urge the wheels to a straight position when the hydraulics are released during forward movement, and to limit the impact forces between the steering limit stop 102 and bumper 108 during extreme turning maneuvers when backing.

The above-described trailer steering centering mechanism serves to resist angular steering input at and near the predetermined geometric steering limits for the trailer, but the spring force does relatively little to resist steering input from the neutral or straight ahead position of the trailer wheels, particularly when identical centering mechanisms are installed upon each crossmember 32 of the steering frame 18. The lack of any means for holding the trailer wheels precisely aligned would result in instability and trailer wandering during forward travel. Accordingly, a steering lock mechanism is provided for the trailer steering, as shown in the left side elevation view of FIG. 11.

Figure 11:
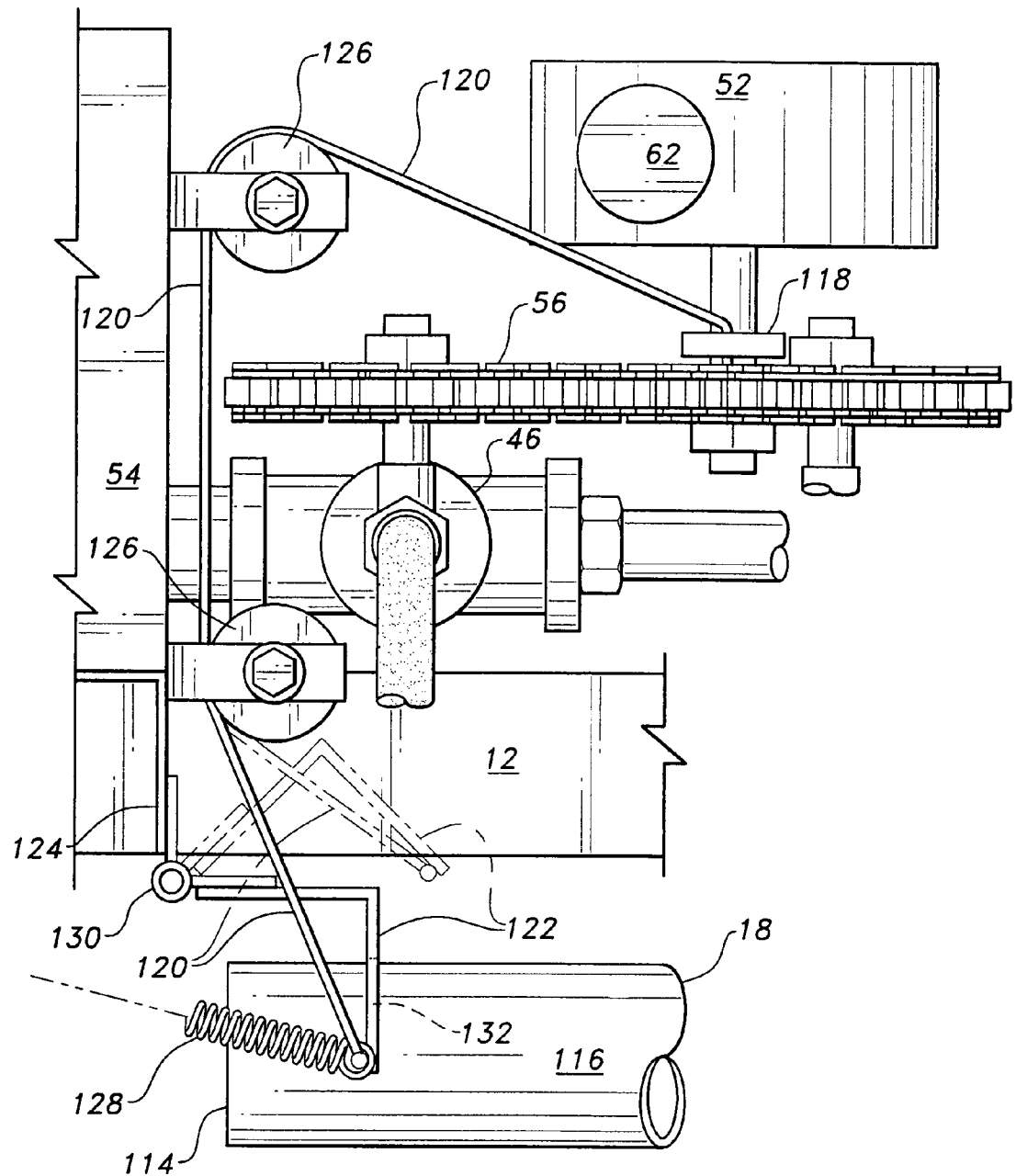
FIG. 11 is a left side elevation view of the locking mechanism for securing the trailer wheels in a straight ahead position for forward travel in a trailer steering mechanism according to the present invention.

FIG. 11 illustrates the distal forward end 114 of the forwardly extending arm 116 of the trailer steering frame 18, disposed generally beneath the hydraulic valve actuator 52 and its motor 62 and other componentry. The valve actuator 52 includes an actuator shaft and arm assembly 118 extending therefrom, with the actuator shaft serving to rotate the hydraulic valve drive sprocket 58 (shown in FIG. 6). A steering frame lock cable 120 (or chain or other flexible member, etc.) extends in tension from the arm of the actuator shaft and arm assembly 118, ultimately connecting to a steering frame arm lock 122, which is pivotally attached laterally to the trailer frame 12, or more precisely to a crossmember 124 extending between the two lateral members of the frame 12. The cable 120 may pass over or through one or more pulleys 126 or guides, fairleads, etc. in order to achieve the proper routing and direction of operation. A down spring 128 urges the steering frame arm lock 122 down to its engaged position to capture the forward end portion 114 of the forwardly extending steering frame arm 116. The steering frame arm lock 122 may comprise a laterally disposed length of material having a generally L-shaped cross section, e.g., "angle iron" or the like. The side or face opposite its attachment hinge 130 includes a steering arm engagement slot 132 therein (shown in broken lines in FIG. 11), which fits fairly precisely over the forward arm portion 116 of the steering frame.

When the actuator 52 is operated to close the hydraulic control valves 44 through 50 (shown in FIG. 6; a conventional solenoid may be used to reposition a lever or arm, for the solenoid valve system of FIG. 7), or alternatively, the single valve 70 (shown in FIG. 9) to allow the trailer wheels to be steered for backing maneuvers, the actuator shaft and arm 118 rotate to the right, as shown in the side view of FIG. 11, pulling the upper portion of the cable 120 to the right and the lower end of the cable upwardly, thereby drawing the steering arm lock 122 upwardly generally to its position as shown in broken lines in FIG. 11. This allows the forward end portion 114 of the steering frame arm 116 to swing laterally in accordance with steering input due to the articulation between the towing vehicle V and trailer 10, to the limits defined by the steering centering and stop mechanism of FIG. 10 and/or any other mechanical limits.

However, when the towing vehicle is placed in a neutral or forward gear, i.e., the backup signal is no longer activated, the valve actuator 52 rotates the actuator shaft and arm assembly 118 to the position shown in FIG. 11, thereby allowing the down spring 128 to draw the cable 120 and steering arm lock 122 downwardly against the top of the steering frame arm 116. The lower edge of the steering arm lock 122 will ride against the upper surface of the steering frame arm 116 if the arm is not centered. However, when the trailer 10 is pulled forward slightly, the wheel centering spring(s) 112 cause the steerable wheels 28a, 28b of the trailer 10 to move to a straight ahead position, thus forcing the arm 116 to center. This allows the engagement slot 132 of the steering arm lock 122 to drop downwardly over the steering frame arm 116, thus capturing the arm 116 within the slot 132 of the steering arm lock 122 to lock the arm 116 and its steering frame 18 and trailer wheels 28a, 28b straight for stable towing of the trailer 10 during forward travel. The engagement of the steering arm lock 122 with the steering frame arm 116 is easily detected by the driver of the tow vehicle, as the lock 122 is pulled sharply down over the steering arm 116 when the arm centers. Alternatively, a solenoid actuator may be used to control the steering arm lock 122. The solenoid actuator would be controlled by the same electrical circuit as used to control a solenoid valve system, e.g., the system of FIG. 7 of the drawings.

The above-described trailer towing mechanism and trailer with its steerable wheels is directed to a trailer having a single axle with two steerable wheels, one on each end of the single axle. However, the trailer steering mechanism may also be applied to trailers having multiple axles, such as the farm wagon type trailer 10a of FIG. 5. The trailer 10a of FIG. 5 has a frame 12a (shown as a solid peripheral edge for the trailer 10a in FIG. 5) carrying a forward axle 30a and a rearward axle 30b, with the forward axle 30a having free steering left and right wheels 28c, 28d at the opposite ends thereof and the rearward axle 30b having directionally steerable wheels 28e, 28f at the opposite ends thereof. The front wheels 28c, 28d are free steering in the sense that they are directionally articulating, but do not include a steering control mechanism. A tie rod 26a extends between the steering mechanism of each steerable rear wheel 28e, 28f, with the tie rod 26a being connected to the steering frame 18a by an intermediate steering link 24a.

Figure 3:
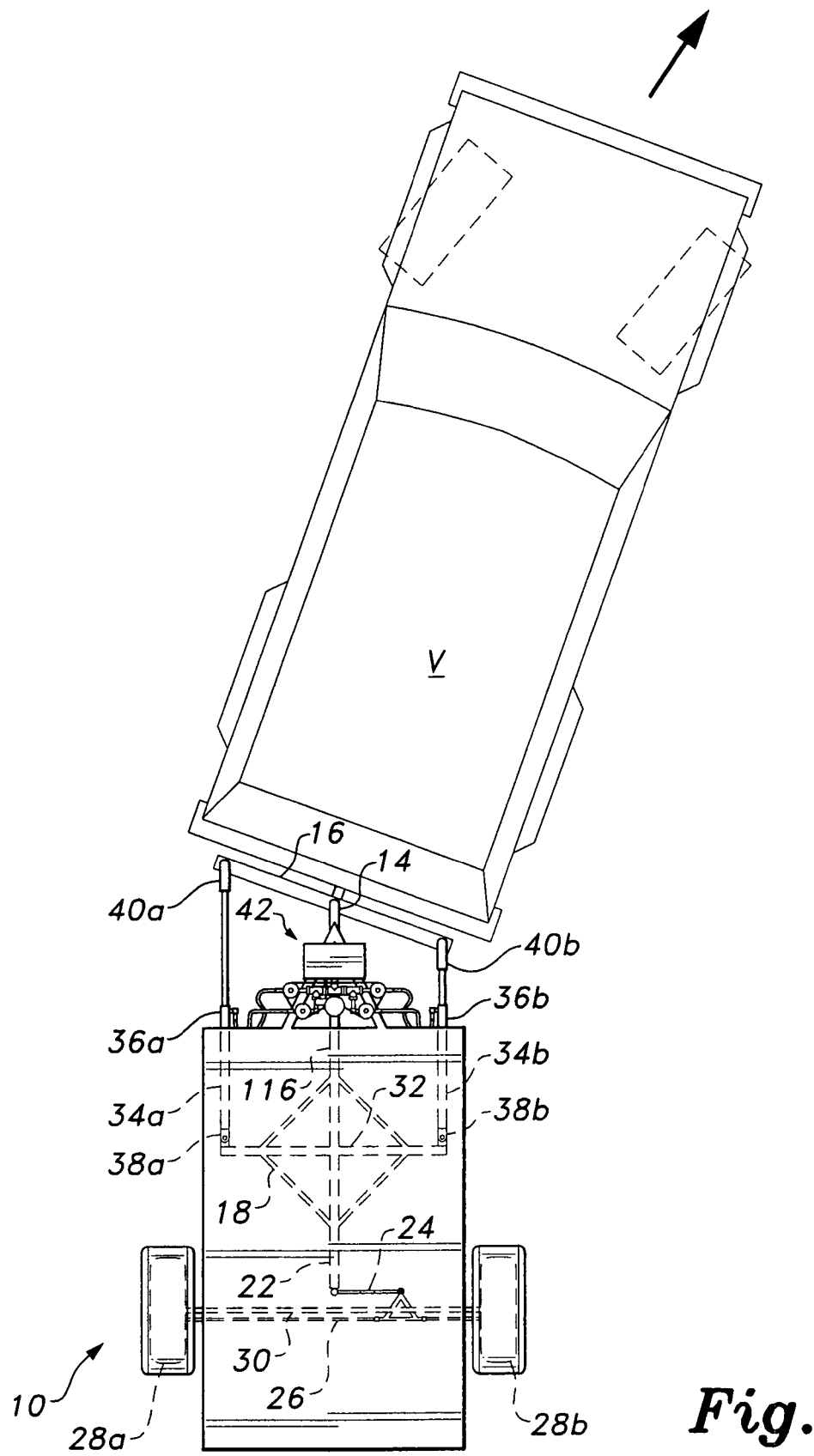
FIG. 3 is a schematic top plan view showing a towing vehicle and trailer steering mechanism according to the present invention during forward travel, with the trailer wheels being locked straight for forward travel.
Figure 4:
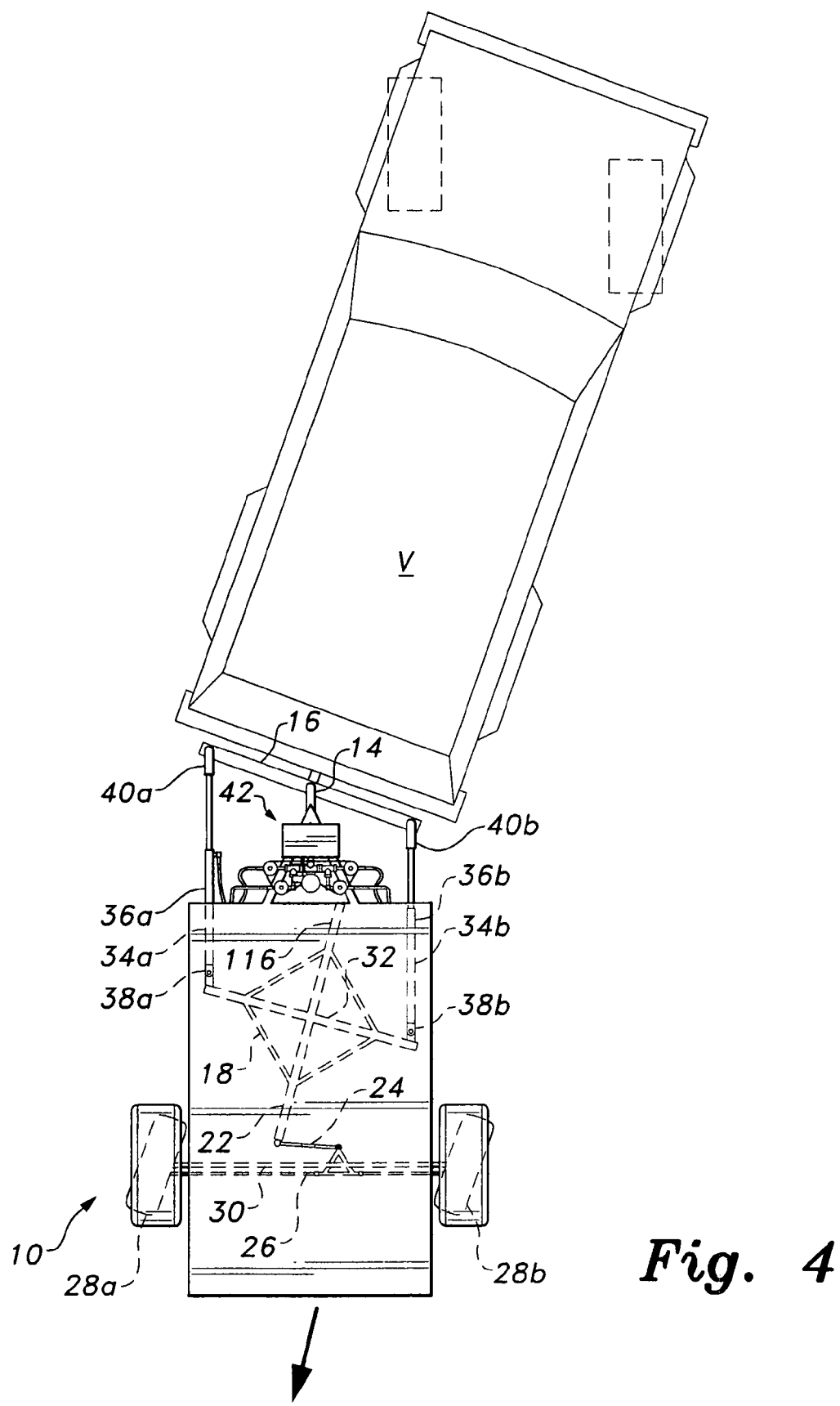
FIG. 4 is a schematic top plan view showing a towing vehicle and trailer steering mechanism according to the present invention during a backing maneuver, with the trailer wheels automatically turning to align the trailer with the path of the towing vehicle.

The steering mechanism for the trailer 10a with its rearward axle 30b and its directionally steerable rear wheels 28e, 28f is generally the same steerable wheel mechanism as described further above for the trailer 10 with its single axle 30 and steerable wheels 28a, 28b, shown in FIGS. 2 through 4 of the drawings. However, the pivotally mounted steering frame 18a includes a rearward steering arm extension 22a to which the intermediate steering link 24a is attached, with the distal end of the link 24a being attached to the rear axle tie rod 26a. Thus, only the rear wheels 28e, 28f extending from the rear axle 30b of the trailer 10a may be steered, with the front wheels 28c, 28d being free steering, i.e. not connected to or directionally controlled by a steering mechanism.

The rear axle steering mechanism of the rear wheel steering trailer 10 is controlled by means of the same apparatus as provided with the trailer 10. The frame 12a of the trailer 10a includes a forwardly extending rigid tongue 14, with the tongue 14 being removably and pivotally hitched to a lateral hitch bar 16 rigidly attached to the tow vehicle V. The steering frame 18a includes a crossmember 32a which provides for attachment of at least one hydraulic cylinder to the steering frame, with there preferably being one hydraulic strut or cylinder 34a installed to the left side of the trailer tongue 14 and a second strut or cylinder 34b installed to the right side of the tongue 14. Alternatively, plural struts or cylinders may be installed to each side of the central tongue 14, if so desired, particularly in the case of a relatively large and heavy multiple axle farm wagon-type trailer 10a. Each of the cylinders 34a, 34b has a hitch coupling end 36a and 36b and an opposite steering frame attachment end 38a and 38b, with the forward ends 40a, 40b of the cylinder struts being pivotally coupled to, and extending from, the corresponding ends of the hitch bar 16, and the steering frame attachment ends 38a, 38b attaching to the ends of the steering frame crossmember 32a. The struts or cylinders 34a, 34b are parallel to the trailer tongue 14 and to one another, with the tongue 14 being centered between the two struts or cylinders, just as in the case of the single axle trailer 10 embodiment.

The above-described steering mechanism is controlled by a hydraulic cylinder or strut control system 42, as illustrated in FIGS. 6 and 7 of the drawings and described in detail further above. Alternatively, the multiple valve mechanism of the system 42 may be replaced by the single valve mechanism 70 of FIG. 9, if so desired. The system operates in essentially the same manner as described above for the single-axle trailer 10, but steers only the wheels and tires 28e and 28f of the rear axle 30b, with the forward wheels and tires 28c, 28d of the front axle 30a being able to free steer at all times during forward or rearward travel.

Figure 5:
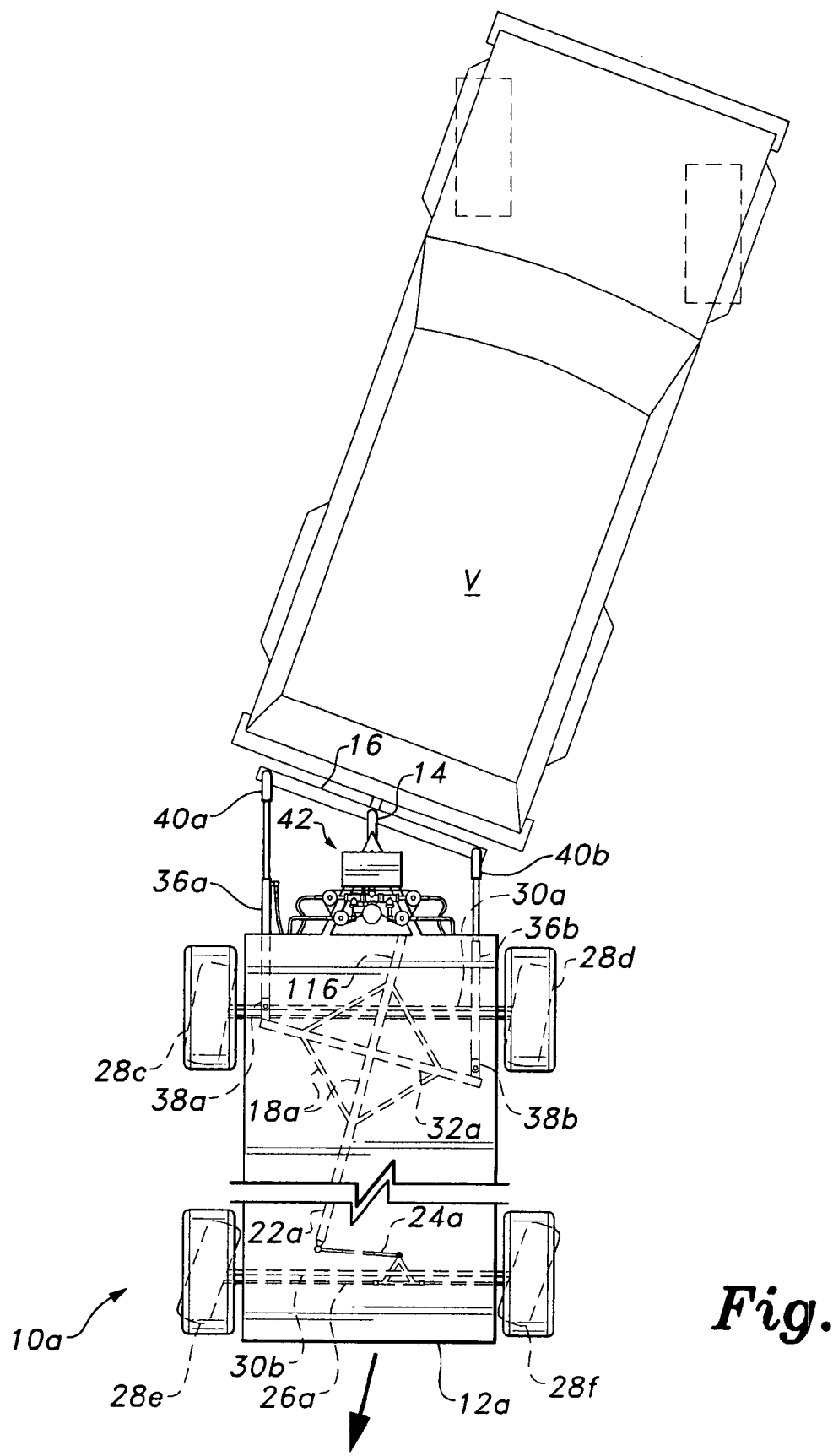
FIG. 5 is a schematic top plan view of an alternative embodiment of trailer and trailer steering mechanism according to the present invention, wherein the trailer has forward free-steering wheels and a rearward axle having steerable wheels thereon controlled by a steering mechanism.

When the tow vehicle V towing the multiple axle trailer 10a of FIG. 5 is towing the trailer forward, the hydraulic system is open to allow hydraulic fluid to flow freely between the two cylinders 36a and 36b, thereby allowing the two cylinders to extend and retract in accordance with articulation between the tow vehicle V and trailer 10a without actuating the steering frame 18a and associated steering linkage to the rear axle 30b. Thus, the rear wheels and tires 28a, 28f track in a straight line relative to the centerline of the trailer 10a, during forward travel. The two front wheels 28c, 28d steer freely to allow the trailer 10a to negotiate turns while traveling forward.

When the twin-axle trailer 10a is to be backed, the two hydraulic cylinders or struts 36a, 36b are hydraulically locked, as in the case of the single-axle trailer 10. This results in any articulation between the tow vehicle V and trailer 10a rotating the steering frame 18a, thus steering the rear wheels 28e, 28f. The front wheels 28c, 28d are free to steer or articulate directionally as required to enable the tow vehicle V and two axle trailer 10a combination to negotiate turns as required.

In conclusion, the trailer steering mechanism in its various embodiments provides a means for greatly simplifying the steering or guidance of a trailer during backing maneuvers. The system may automatically switch from a directionally locked mode for forward travel to steering mode for backing maneuvers, or may, alternatively, be manually switched, if so desired. While the trailer steering mechanism is particularly well suited to trailers having a single axle and two wheels, it may be adapted to other types of trailers having multiple axles as well, with little modification. Accordingly, the trailer steering mechanism will prove to be extremely popular with vehicle operators who have need to tow and back a trailer from time to time.

It is to be understood that the present invention is not limited to the embodiments described above, but encompasses any and all embodiments within the scope of the following claims.

I claim:

1. A sealed, pumpless hydraulic trailer steering mechanism for a trailer, the trailer having steerable wheels and a frame with a rigid tongue pivotally attached to a tow vehicle, the trailer steering mechanism comprising:
- a rearwardly disposed, lateral hitch bar adapted for being rigidly and immovably attached to the tow vehicle;
- a steering frame pivotally attached to the trailer frame, said steering frame including an elongated steering arm extending substantially the entire length of said steering frame and a cross member extending laterally substantially the entire width of said steering frame;
- a steering linkage extending between the steering frame and the steerable wheels of the trailer;
- at least one hydraulic cylinder extending between the hitch bar and the steering frame parallel to the tongue of the trailer, wherein said at least one hydraulic cylinder includes a hitch bar coupling end and a steering frame attachment end; and
- a hydraulic cylinder control mechanism selectively locking the at least one hydraulic cylinder during backing maneuvers and opening the at least one hydraulic cylinder during forward travel, wherein said control mechanism defines a sealed, pumpless hydraulic system including a first hydraulic valve controlling hydraulic flow to the hitch bar coupling end of said hydraulic cylinder, a second hydraulic valve controlling hydraulic flow to the steering frame attachment end of said hydraulic cylinder, and a valve actuator linked to each of the hydraulic valves and controlling hydraulic fluid flow therethrough and to each end of said at least one hydraulic cylinder.

2. The trailer steering mechanism according to claim 1, wherein said at least one hydraulic cylinder comprises a left side hydraulic cylinder and a right side hydraulic cylinder, the trailer tongue being centered between the left side hydraulic cylinder and the right side hydraulic cylinder.

3. The trailer steering mechanism according to claim 2, wherein said right side hydraulic cylinder having a hitch bar coupling end and a steering frame attachment end, said hydraulic cylinder control mechanism further comprising:
- a third hydraulic valve controlling hydraulic flow to the hitch bar coupling end of the right side hydraulic cylinder; and
- a fourth hydraulic valve controlling hydraulic flow to the steering frame attachment end of the right side hydraulic cylinder.

4. The trailer steering mechanism according to claim 1, further comprising at least one two-way, double-acting hydraulic pressure relief valve communicating hydraulically with the at least one hydraulic cylinder.

5. The trailer steering mechanism according to claim 1, wherein the steering frame has an arm extending therefrom, the steering mechanism further comprising:
- a steering frame arm lock disposed upon the trailer frame, selectively engaging the arm of the steering frame; and
- a linkage extending between the steering frame arm lock and the hydraulic cylinder control mechanism.

6. The trailer steering mechanism according to claim 1, further comprising:
- at least one steering centering spring disposed between the trailer frame and the steering frame; and
- an adjustable steering limit stop disposed concentrically with the steering centering spring.

7. A sealed, pumpless hydraulic trailer steering mechanism for a trailer, the trailer having steerable wheels and a frame with a rigid tongue pivotally attached to a tow vehicle, the trailer steering mechanism comprising:
- a rearwardly disposed, lateral hitch bar adapted for being rigidly and immovably attached to the tow vehicle;
- a steering linkage extending between the hydraulic steering mechanism and the steering wheels of the trailer;
- at least one hydraulic cylinder, said at least one hydraulic cylinder includes a hitch bar coupling end and an opposite end; and
- a hydraulic cylinder control mechanism selectively locking the at least one hydraulic cylinder during backing maneuvers thereby being in a shut-off flow configuration and opening the at least one hydraulic cylinder during forward travel thereby being in an open flow configuration, wherein said control mechanism defines a sealed, pumpless hydraulic system including a first hydraulic valve controlling hydraulic flow to the hitch bar coupling end of said hydraulic cylinder and a second hydraulic valve controlling hydraulic flow to the opposite end of said hydraulic cylinder.

8. The steering mechanism according to claim 7 wherein said hydraulic cylinder control mechanism further includes a single hydraulic valve having a first port controlling hydraulic flow to said hitch bar coupling end of said hydraulic cylinder and a second port controlling hydraulic flow to said opposite end of said hydraulic cylinder.

9. The steering mechanism according to claim 8 wherein said hydraulic cylinder control mechanism further includes a valve actuator linked to the hydraulic valves and controlling hydraulic fluid flow therethrough and to each end of each of said hydraulic cylinder.

10. The steering mechanism according to claim 7 wherein said hydraulic cylinder control mechanism further includes at least one two-way, double-acting hydraulic pressure relief valve communicating hydraulically with the at least one hydraulic cylinder.

11. The trailer steering mechanism according to claim 1, wherein said control mechanism is pneumatically pressurized.

12. The trailer steering mechanism according to claim 1, wherein said valve actuator is solely manually actuable.

13. The trailer steering mechanism according to claim 7, wherein said control mechanism is pneumatically pressurized.

14. The trailer steering mechanism according to claim 9, wherein said valve actuator is solely manually actuable.

* * * * *